United States Patent
Aghaei et al.

(10) Patent No.: US 8,463,326 B2
(45) Date of Patent: Jun. 11, 2013

(54) HANDHELD ELECTRONIC DEVICE TRANSITIONABLE BETWEEN DIFFERENT CONFIGURATIONS

(75) Inventors: Behzad Aghaei, North York (CA); Norman M. Ladouceur, Waterloo (CA); Steven Fyke, Waterloo (CA)

(73) Assignee: Research In Motion Limited, Waterloo (CA)

( * ) Notice: Subject to any disclaimer, the term of this patent is extended or adjusted under 35 U.S.C. 154(b) by 844 days.

(21) Appl. No.: 12/390,646

(22) Filed: Feb. 23, 2009

(65) Prior Publication Data

US 2010/0216512 A1    Aug. 26, 2010

(51) Int. Cl.
*H04M 1/00* (2006.01)
(52) U.S. Cl.
USPC .................................. 455/566; 455/575.1
(58) Field of Classification Search
USPC ............ 455/575.4, 575.8, 566, 575.1, 556.1, 455/575.3, 550.1, 90.3; 379/433.11–433.13, 379/419, 428, 433
See application file for complete search history.

(56) References Cited

U.S. PATENT DOCUMENTS

| | | | |
|---|---|---|---|
| 5,646,649 A | 7/1997 | Iwata | |
| 6,829,139 B1 | 12/2004 | Duarte | |
| 7,050,767 B2 | 5/2006 | Hickey | |
| 7,443,979 B2* | 10/2008 | Kim | 379/433.12 |
| 7,529,571 B2* | 5/2009 | Byun et al. | 455/575.4 |
| 7,610,069 B2* | 10/2009 | Kwak et al. | 455/575.4 |
| 7,953,448 B2* | 5/2011 | Pletikosa et al. | 455/564 |
| 2004/0206876 A1* | 10/2004 | Kato | 248/349.1 |
| 2005/0078443 A1 | 4/2005 | Lee | |
| 2005/0111172 A1 | 5/2005 | Wang | |
| 2006/0025184 A1* | 2/2006 | Cho et al. | 455/575.4 |
| 2006/0030381 A1 | 2/2006 | Byun | |
| 2006/0035678 A1 | 2/2006 | Jaakkola | |

(Continued)

FOREIGN PATENT DOCUMENTS

| | | |
|---|---|---|
| DE | 102004031409 A1 | 2/2006 |
| EP | 0802659 A | 10/1997 |

(Continued)

OTHER PUBLICATIONS

Examination Report dated Dec. 17, 2010. In corresponding application No. 09153413.1.

(Continued)

*Primary Examiner* — Crystal L Hammond
(74) *Attorney, Agent, or Firm* — Timothy Clise; Fitch, Even, Tabin & Flannery LLP

(57) ABSTRACT

A handheld electronic device transitionable between different configurations includes a keyboard panel having a slot, a display panel, a coupler that rotary couples the keyboard panel and the display panel and slidingly engages the slot of the keyboard panel. The display panel is positioned such that is substantially parallel with the keyboard panel in a compact configuration. When the device is transitioned from the compact to translated configuration, the coupler engages the slot. When the device is transitioned from the translated to expanded configuration, the display panel is rotated about the coupler such that the centerpoint of the display panel is closer to the centerpoint of the keyboard panel in the expanded configuration as compared to the translated configuration. The coupler can comprise a rotation control mechanism coupled to a biasing member or can have teeth that engages a track or can be a cam that engages a t-shaped slot.

18 Claims, 10 Drawing Sheets

U.S. PATENT DOCUMENTS

| | | |
|---|---|---|
| 2006/0066740 A1 | 3/2006 | Cheng |
| 2006/0281448 A1 | 12/2006 | Plestid |
| 2008/0045282 A1* | 2/2008 | Huang .................. 455/575.4 |
| 2008/0207272 A1* | 8/2008 | Thornton et al. ............ 455/566 |
| 2008/0232070 A1* | 9/2008 | Kuwajima et al. ............ 361/727 |
| 2009/0061956 A1* | 3/2009 | Matsuoka .................. 455/575.1 |
| 2009/0221336 A1* | 9/2009 | Zhang et al. ................ 455/575.4 |

FOREIGN PATENT DOCUMENTS

| | | |
|---|---|---|
| EP | 1271897 A | 1/2003 |
| EP | 1533984 A | 5/2005 |
| EP | 1600843 A | 11/2005 |
| EP | 1622342 A | 2/2006 |
| EP | 1699209 A | 9/2006 |
| EP | 1764672 A | 3/2007 |
| EP | 1862884 A1 | 12/2007 |
| WO | 0184728 A | 11/2001 |
| WO | 03050665 A1 | 6/2003 |
| WO | 2004054210 A | 6/2004 |
| WO | 2005064435 A | 7/2005 |
| WO | 2005104504 A | 11/2005 |
| WO | 2005119407 A | 12/2005 |
| WO | 2006034949 A1 | 4/2006 |
| WO | 2006060259 A | 6/2006 |
| WO | 2007035008 A | 3/2007 |
| WO | 2007137448 A1 | 12/2007 |

OTHER PUBLICATIONS

Partial European Search Report dated Jul. 14, 2009. In corresponding application No. 09153413.1.

Extended European Search Report dated Sep. 23, 2009. In corresponding application No. 09153413.1.

* cited by examiner

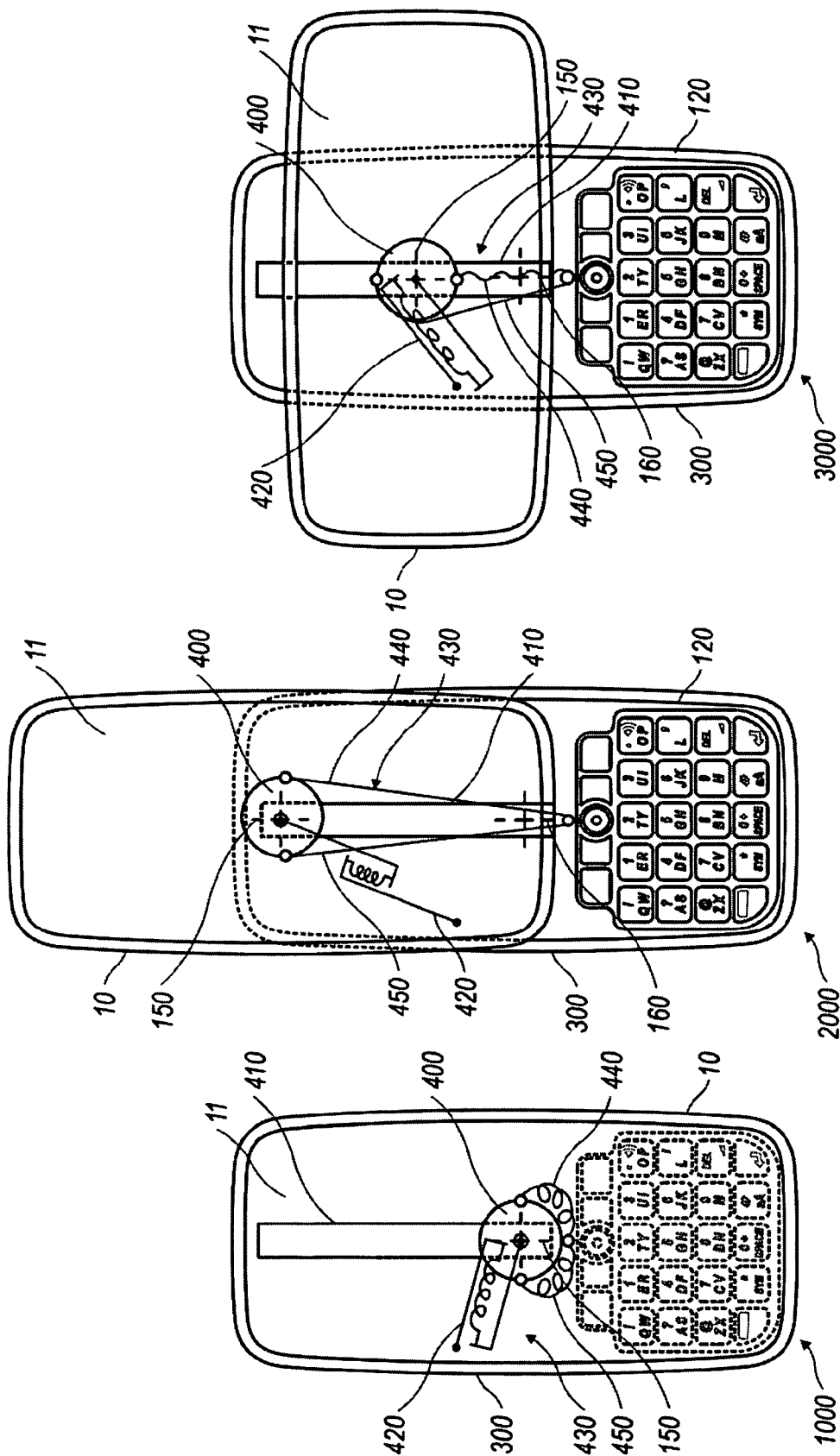

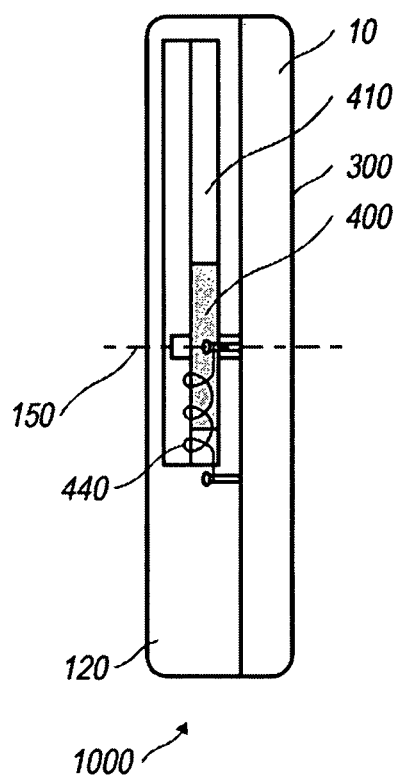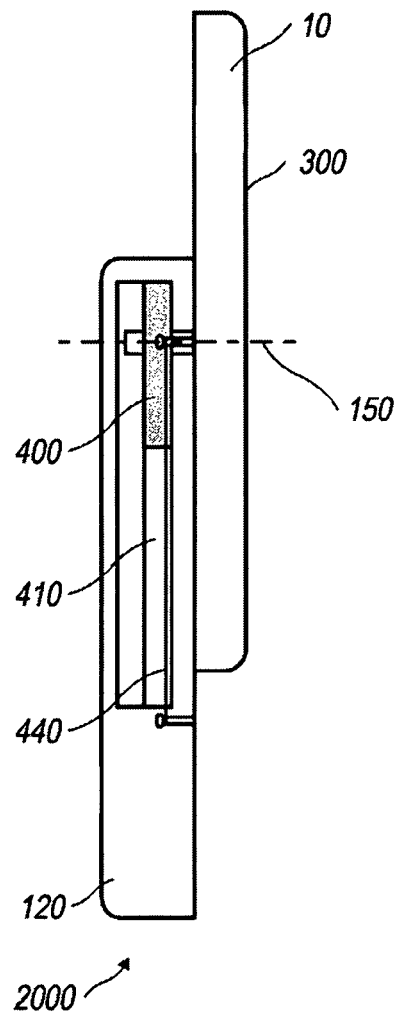
*FIG. 5A*  *FIG. 5B*

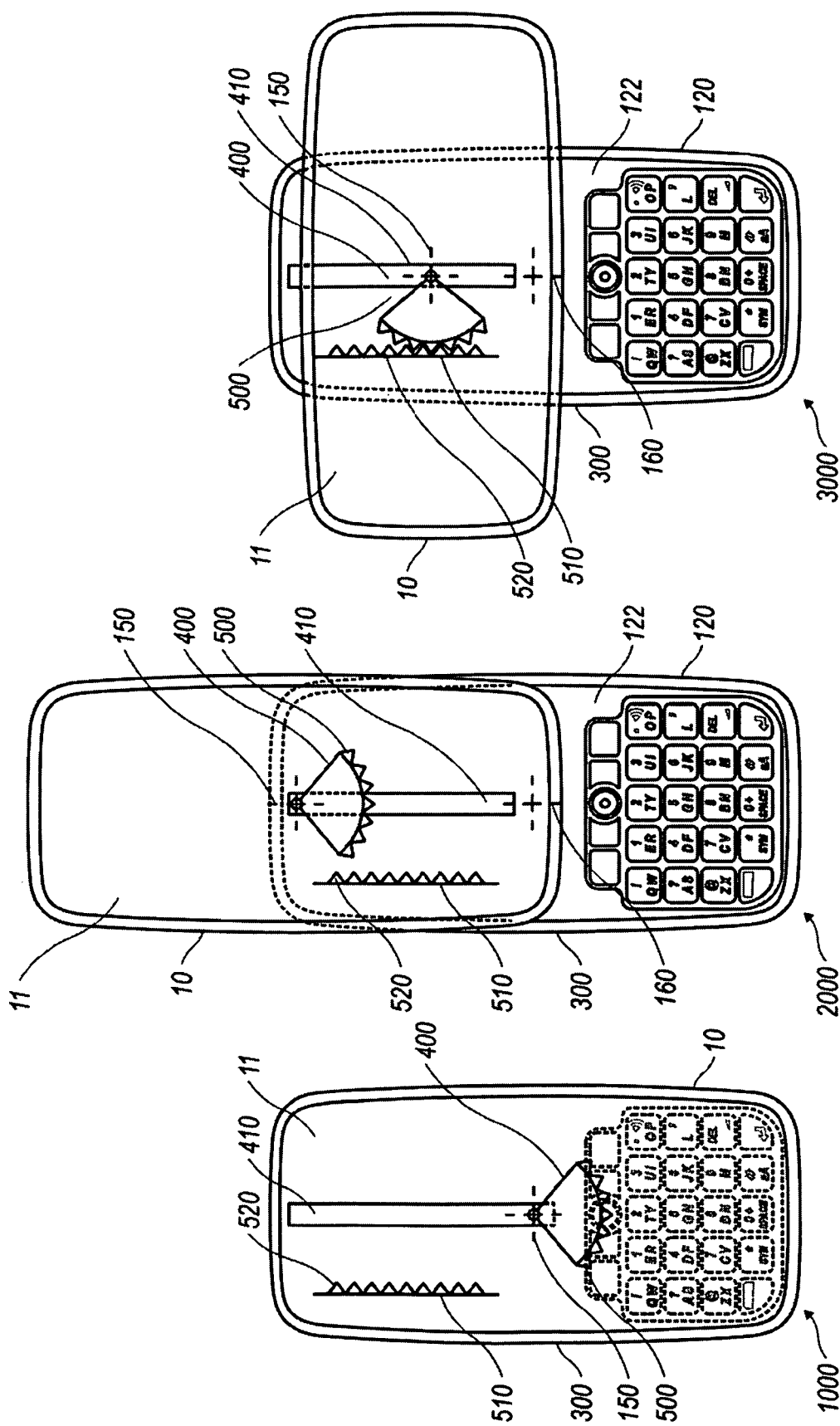

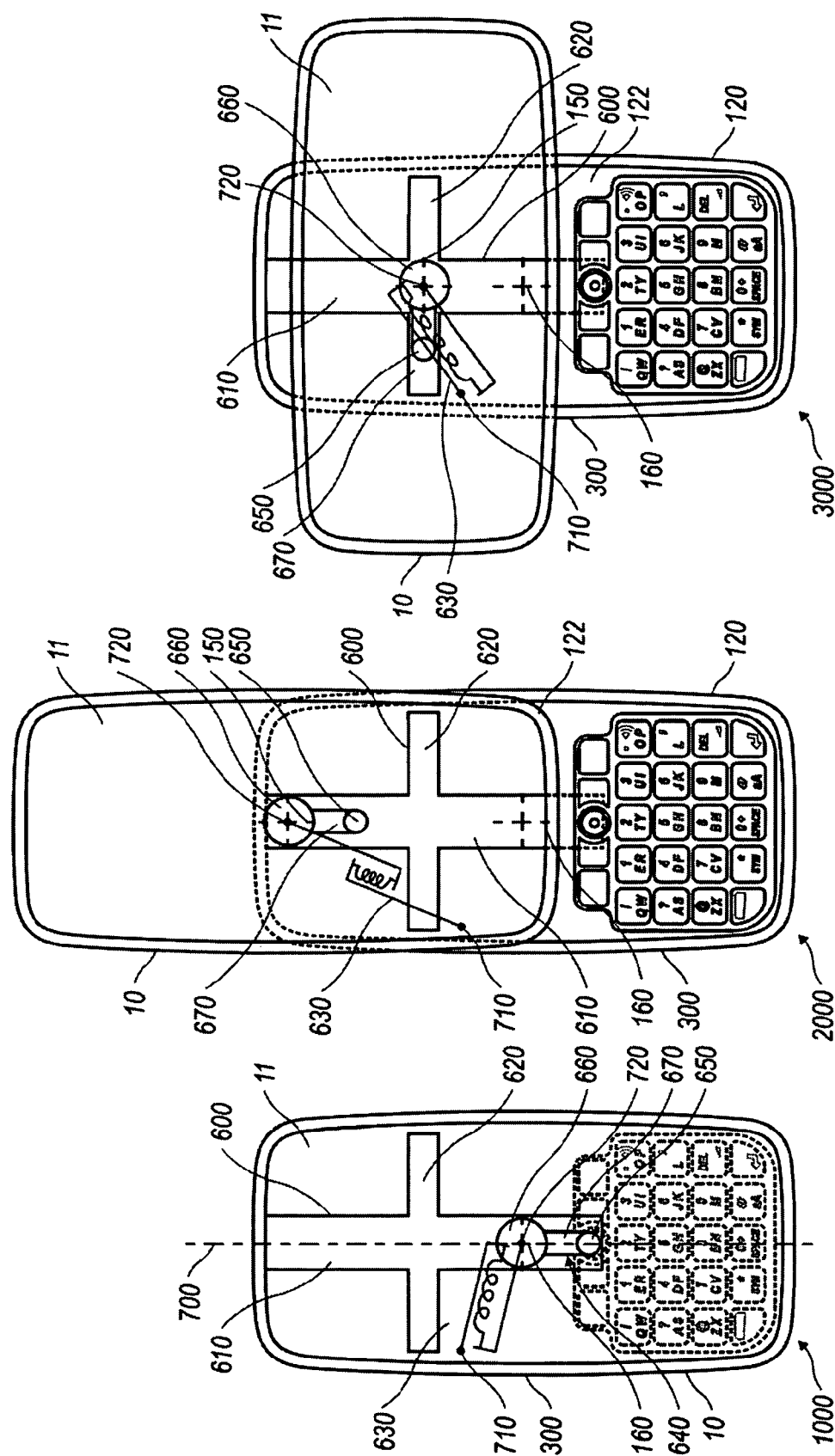

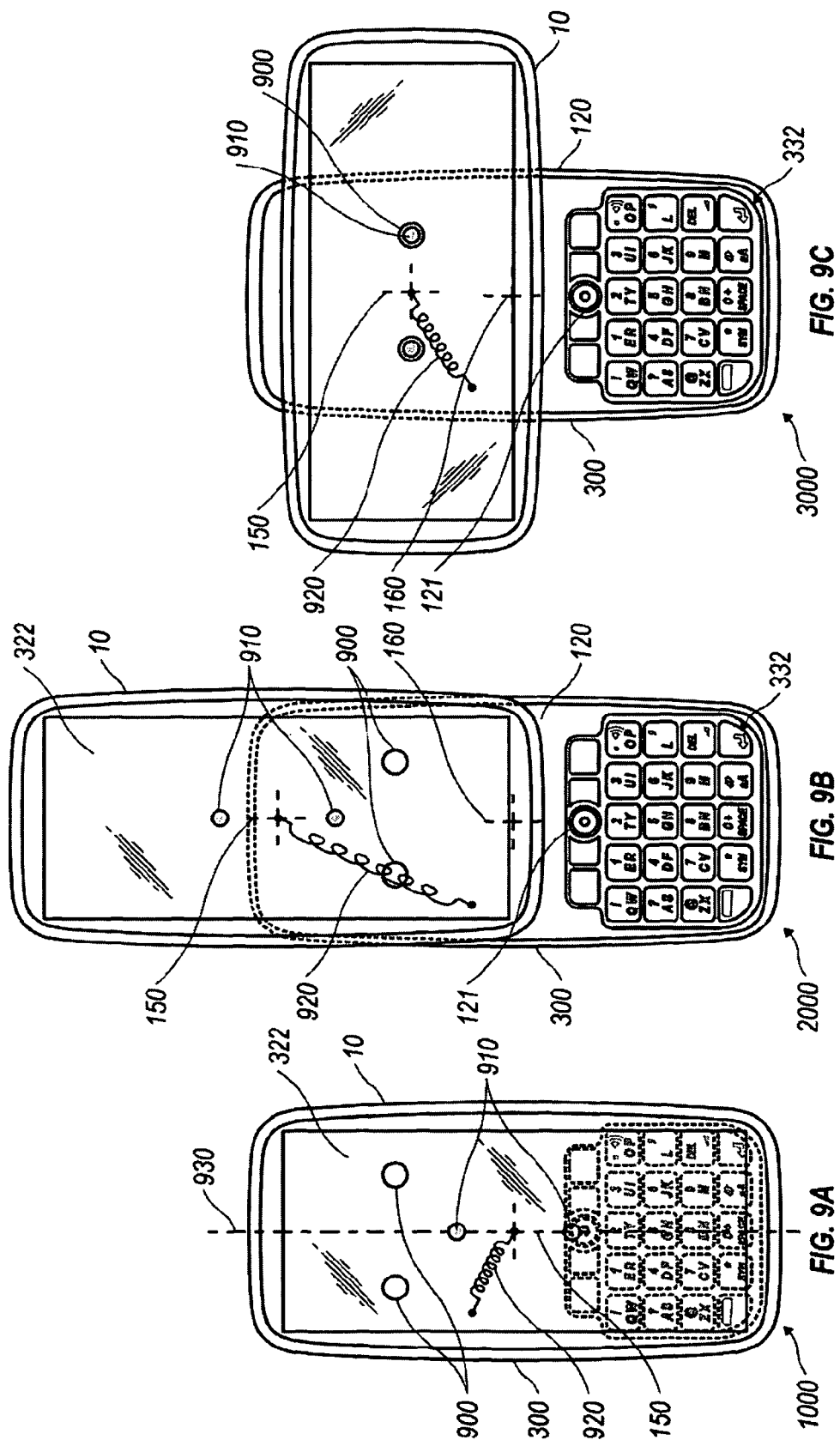

HANDHELD ELECTRONIC DEVICE TRANSITIONABLE BETWEEN DIFFERENT CONFIGURATIONS

FIELD OF TECHNOLOGY

The present disclosure relates generally to handheld electronic devices. More specifically, the present disclosure relates to handheld electronic devices capable of transitioning between different configurations.

BACKGROUND

With the proliferation of communication systems, compatible handheld electronic devices are becoming more prevalent, as well as advanced. Examples of electronic devices include both handheld electronic devices as well as larger devices such as laptop computers, desktop computers and the like. These devices are capable of sending and receiving a variety of different messages including but not limited to short message service (SMS), multimedia message service (MMS), emails, voice messages, and the like.

Whereas in the past such handheld electronic devices typically accommodated either voice transmission (cell phones), or text transmission (pagers and PDAs), today's consumer often demands a combination device capable of performing both types of transmissions, including even sending and receiving e-mail. Furthermore, these higher-performance devices can also be capable of sending and receiving other types of data including that which allows the viewing and use of Internet websites. These higher level functionalities necessarily require greater user interaction with the devices through included user interfaces (UIs) which may have originally been designed to accommodate making and receiving telephone calls and sending messages over a related Short Messaging Service (SMS). As might be expected, suppliers of such mobile electronic devices and the related service providers are anxious to meet these customer requirements, but the demands of these more advanced functionalities have in many circumstances rendered the traditional user interfaces unsatisfactory, a situation that has caused designers to have to improve the UIs through which users input information and control these sophisticated operations.

BRIEF DESCRIPTION OF THE DRAWINGS

Embodiments of the present application will now be described, by way of example only, with reference to the attached Figures, wherein:

FIG. 4A is a partial see-through view of an example handheld electronic device in a compact configuration;

FIG. 4B is a partial see-through view of the example handheld electronic device depicted in FIG. 4A showing the device in an expanded configuration;

FIG. 4C is a partial see-through view of the example handheld electronic device depicted in FIG. 4A showing the device in an extended configuration;

FIG. 5A is a cross-sectional side view of the handheld device configured according to the present application in a compact configuration;

FIG. 5B is a cross-sectional side view of the handheld device depicted in FIG. 5A in a translated configuration;

FIG. 6A is a partial see-through view of another example handheld electronic device in a compact configuration;

FIG. 6B is a partial see-through view of the another example handheld electronic device depicted in FIG. 6A in a translated configuration;

FIG. 6C is a partial see-through view of the another example handheld electronic device depicted in FIG. 6A in an expanded configuration;

FIG. 7A is a partial see-through view of yet another example handheld electronic device in a translated configuration and illustrating a T-shaped coupler in a translated configuration;

FIG. 7B is a partial see-through view of the yet another example handheld electronic device depicted in FIG. 7A in a translated configuration;

FIG. 7C is a partial see-through view of the yet another handheld electronic device depicted in FIG. 7A in an expanded configuration;

FIG. 9A is a partial see-through view of another example of the handheld electronic device in a compact configuration;

FIG. 9B is a partial see-through view of another example of the handheld electronic device depicted in FIG. 9A in a translated configuration; and FIG. 9C is a partial see-through view of another example of the handheld electronic device depicted FIG. 9A in an expanded configuration,

DETAILED DESCRIPTION

Figure 1:
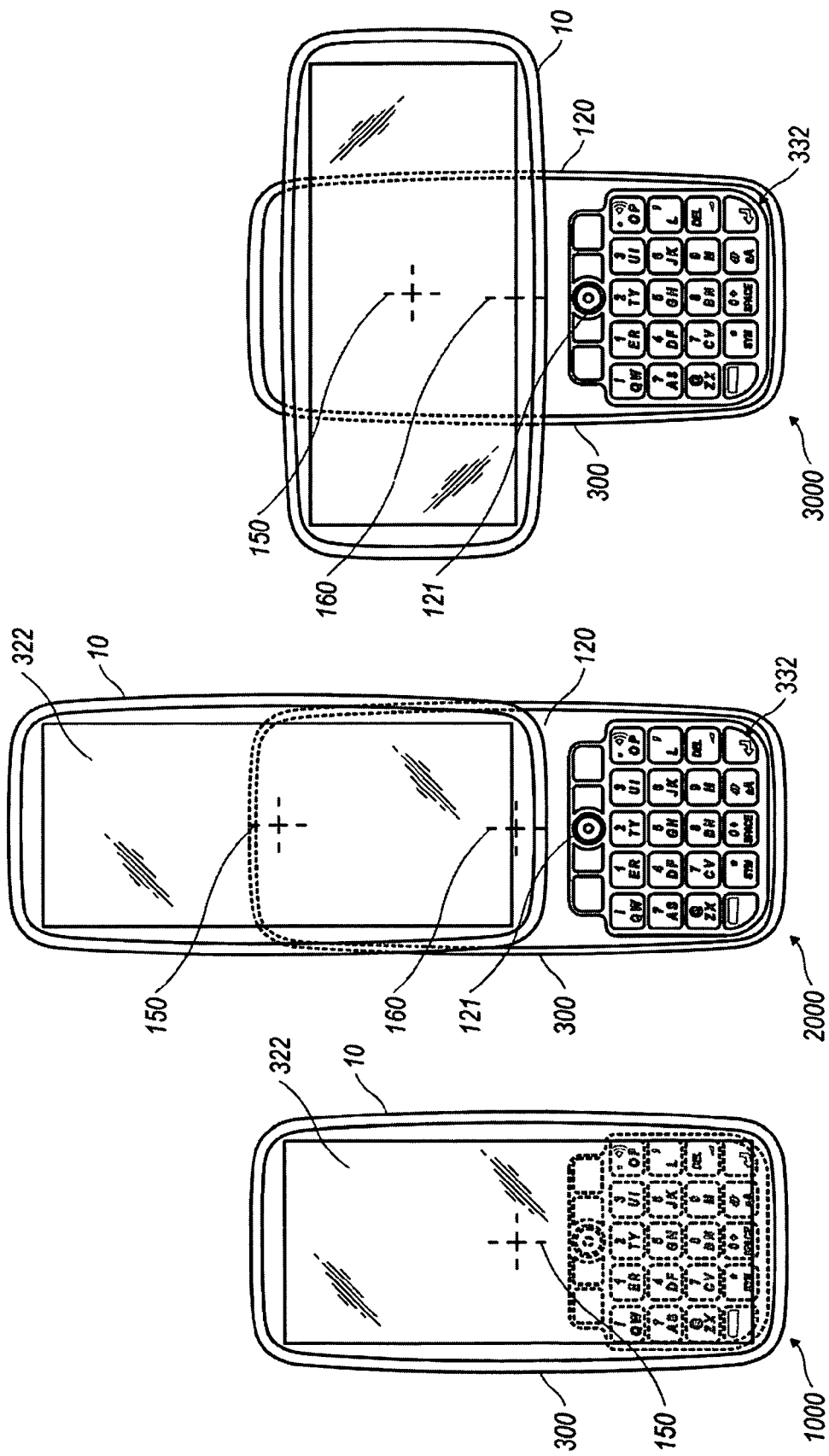
FIG. 1A is a handheld electronic device configured according to the present disclosure in a compact configuration.
FIG. 1B is a handheld electronic device configured according to the present disclosure in a translated configuration.
FIG. 1C is a handheld electronic device configured according to the present disclosure in an expanded configuration.
Figure 2:
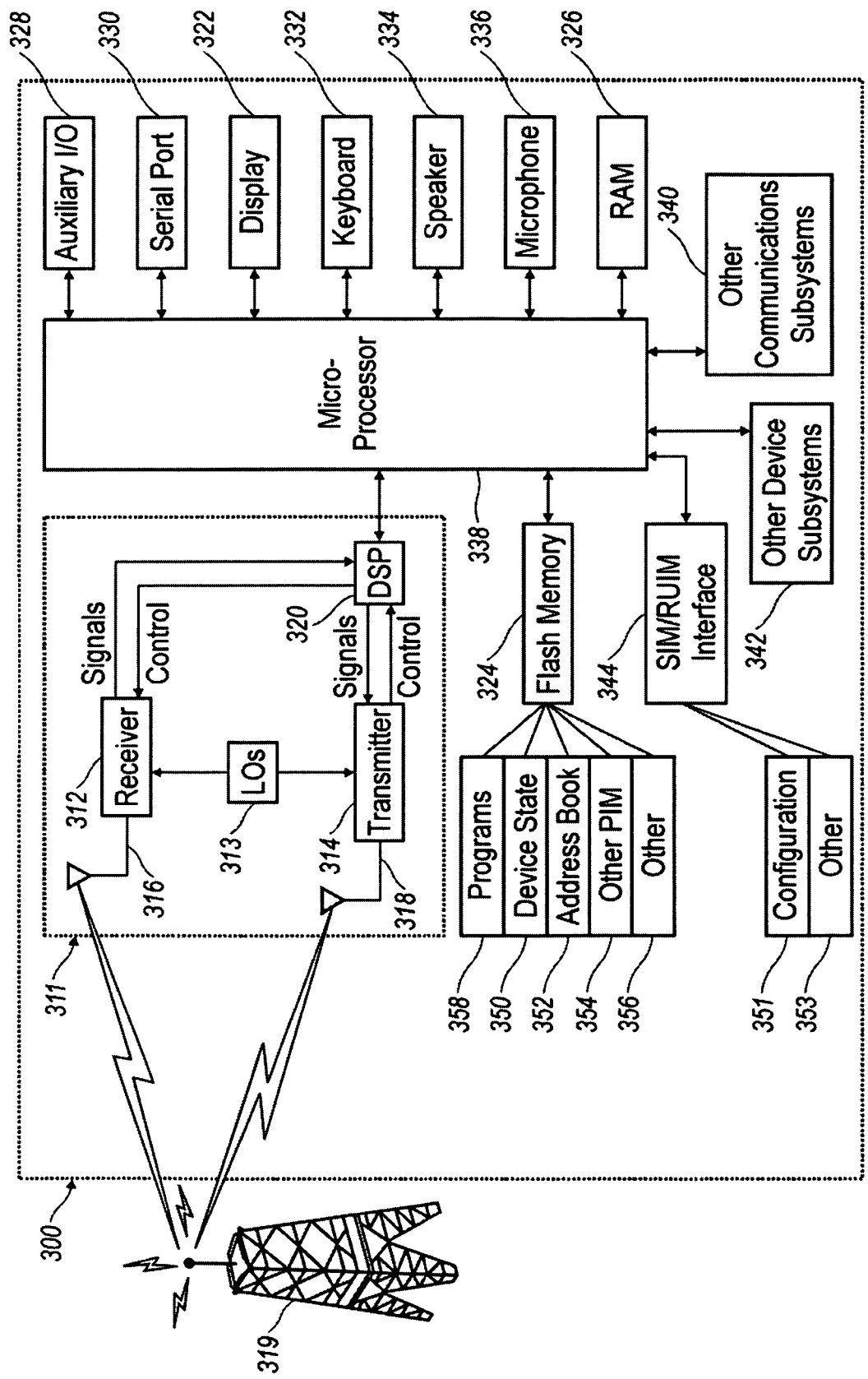
FIG. 2 is a block diagram representing a wireless handheld electronic device interacting in a communication network.

An exemplary handheld electronic device 300 such as is shown in FIG. 1 and the device's cooperation in a wireless network 319 is exemplified in the block diagram of FIG. 2. These figures are exemplary only, and those persons skilled in the art will appreciate the additional elements and modifications necessary to make the device 300 work in particular network environments.

As used herein, the term handheld electronic device describes a relatively small device that is capable of being held in a user's hand. It is a broader term that includes devices that are further classified as handheld electronic devices, which interact with a communications network.

As shown in the block diagram of FIG. 2, the electronic device 300 includes a microprocessor 338 that controls the operation of the electronic device 300. A communication subsystem 311 performs all communication transmission and reception with the wireless network 319. The microprocessor 338 further can be connected with an auxiliary input/output (I/O) subsystem 328 which can be connected to the device 300. Additionally, in at least one embodiment, the microprocessor 338 can be connected to a serial port (for example, a Universal Serial Bus port) 330 which can allow for communication with other devices or systems via the serial port 330. A display 322 can be connected to microprocessor 338 to allow for displaying of information to an operator of the device 300. When the electronic device 300 is equipped with a keyboard 332, which maybe physical or virtual, the keyboard 332 can also be connected with the microprocessor 338. The electronic device 300 can include a speaker 334, a microphone 336, random access memory 326 (RAM), and flash memory 324, all of which may be connected to the microprocessor 338. Additionally, a vibrator (not shown), which can be a vibrator motor, can be connected with the microprocessor 338 to generate vibrations in the electronic device 300. Other similar components may be provided on the device 300 as well and optionally connected to the microprocessor 338. Other communication subsystems 340 and other communication device subsystems 342 are generally indicated as being functionally connected with the microprocessor 338 as well. An example of a communication subsystem 340 is that of a short range communication system such as BLUETOOTH® communication module or a WI-FI® communication module (a communication module in compliance with IEEE 802.11b) and associated circuits and components. Additionally, the microprocessor 338 is able to perform operating system functions and enables execution of programs on the electronic device 300. In some embodiments not all of the above components may be included in the electronic device 300. For example, in at least one embodiment the keyboard 332 is not provided as a separate component and is instead integrated with a touch-sensitive display.

Furthermore, the electronic device 300 is equipped with components to enable operation of various programs, as shown in FIG. 2. In an exemplary embodiment, the flash memory 324 is enabled to provide a storage location for the operating system (not shown), device programs 358, and data. The operating system is generally configured to manage other programs 358 that are also stored in memory 324 and executable on the processor 338. The operating system honors requests for services made by programs 358 through predefined program 358 interfaces. More specifically, the operating system typically determines the order in which multiple programs 358 are executed on the processor 338 and the execution time allotted for each program 358, manages the sharing of memory 324 among multiple programs 358, handles input and output to and from other device subsystems 342, and so on. In addition, operators can typically interact directly with the operating system through a user interface usually including the keyboard 332 and display screen 322. While in an exemplary embodiment the operating system is stored in flash memory 324, the operating system in other embodiments is stored in read-only memory (ROM) or similar storage element (not shown). As those skilled in the art will appreciate, the operating system, device program 358 or parts thereof may be loaded in RAM 326 or other volatile memory.

In one exemplary embodiment, the flash memory 324 contains programs 358 for execution on the electronic device 300 including an address book 352, a personal information manager (PIM) 354, and the device state 350. Furthermore, programs 358 and other information 356 including data can be segregated upon storage in the flash memory 324 of the electronic device 300.

When the electronic device 300 is enabled for two-way communication within the wireless communication network 319, it sends and receives signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the electronic device 300 may require a unique identifier to enable the electronic device 300 to transmit and receive signals from the communication network 319. Other systems may not require such identifying information. GPRS, UMTS, and EDGE use a Subscriber Identity Module (SIM) in order to allow communication with the communication network 319. Likewise, most CDMA systems use a Removable User Identity Module (RUIM) in order to communicate with the CDMA network. The RUIM and SIM card can be used in a multitude of different electronic devices 300. The electronic device 300 can operate some features without a SIM/RUIM card, but a SIM/RUIM card is necessary for communication with the network 319. A SIM/RUIM interface 344 located within the electronic device 300 allows for removal or insertion of a SIM/RUIM card (not shown). The SIM/RUIM card features memory and holds key configurations 351, and other information 353 such as identification and subscriber related information. With a properly enabled electronic device 300, two-way communication between the electronic device 300 and communication network 319 is possible.

If the electronic device 300 is enabled as described above or the communication network 319 does not require such enablement, the two-way communication enabled electronic device 300 is able to both transmit and receive information from the communication network 319. The transfer of communication can be from the electronic device 300 or to the electronic device 300. In order to communicate with the communication network 319, the electronic device 300 in the presently described exemplary embodiment is equipped with an integral or internal antenna 318 for transmitting signals to the communication network 319. Likewise the electronic device 300 in the presently described exemplary embodiment is equipped with another antenna 316 for receiving communication from the communication network 319. These antennae 316, 318 in another exemplary embodiment are combined into a single antenna (not shown). As one skilled in the art would appreciate, the antenna or antennae 316, 318 in another embodiment are externally mounted on the electronic device 300.

When equipped for two-way communication, the electronic device 300 includes a communication subsystem 311. As is understood in the art, this communication subsystem 311 supports the operational needs of the electronic device 300. The subsystem 311 includes a transmitter 314 and receiver 312 including the associated antenna or antennae 316, 318 as described above, local oscillators (LOs) 313, and a processing module 320 which in the presently described exemplary embodiment is a digital signal processor (DSP) 320.

It is contemplated that communication by the electronic device 300 with the wireless network 319 is any type of communication that both the wireless network 319 and electronic device 300 are enabled to transmit, receive and process. In general, these can be classified as voice and data. Voice communication generally refers to communication in which signals for audible sounds are transmitted by the electronic device 300 through the communication network 319. Data generally refers to all other types of communication that the electronic device 300 is capable of performing within the constraints of the wireless network 319.

The included auxiliary I/O subsystem 328 can take the form of a variety of different navigation tools such as a trackball 121 (shown in at least FIG. 1B) based device or a joystick, just as examples. These navigation tools can be located on the front of the device 300 but may be located on any exterior face of the device 300. Other auxiliary I/O devices can include external display devices and externally connected keyboards (not shown). While the above examples have been provided in relation to the auxiliary I/O subsystem 328, other subsystems capable of providing input or receiving output from the handheld electronic device 300 are considered within the scope of this disclosure. Additionally, other keys may be placed along the side of the device 300 to function as escape keys, volume control keys, scrolling keys, power switches, or user programmable keys, and may likewise be programmed accordingly.

As may be appreciated from at least FIGS. 1A and 1B, the handheld electronic device 300 comprises a lighted display 322 located above a keyboard 332 suitable for accommodating textual input to the handheld electronic device 300 when in an operable configuration. As shown, the device 300 can transition to different configurations in which the display panel 10 and keyboard panel 120 are arranged in different spatial relationships.

Keys, typically of a push-button or push-pad nature, perform well as data entry devices but present problems to the user when they must also be used to affect navigational control over a screen-cursor. In order to solve this problem the present handheld electronic device 300 preferably includes a trackball 121 which is exteriorly located upon the keyboard panel 120 of the device 300. Its front location can be advantageous because it makes the tool easily thumb-actuable like the keys of the keyboard 332. The trackball 121 can instruct screen cursor movement in substantially any direction, as well as act as an actuator when the ball 121 is depressed like a button. The placement of the trackball 121 can be above the keyboard 332 and below the display screen 322; here, it can avoid interference during keyboarding and does not block the user's view of the display screen 322 during use.

FIG. 1A illustrates an example of the handheld electronic device 300 in a compact configuration 1000. In the compact configuration 1000, the handheld electronic device 300 can be used in a telephone mode, a camera mode, browsing mode or the like. Additionally, the display screen 322 on the display panel 10 can be held such that the display screen 322 is in a portrait or landscape orientation. In this compact configuration 1000, only display panel 10, along with associated componentry such as the display screen 322, are visible. The keyboard panel, which can have the keyboard, the navigational input device, function keys, and other inputs, is concealed in the compact configuration 1000.

FIG. 1B shows the handheld electronic device 300 in a translated configuration 2000. In the translated configuration 2000, a keyboard panel 120 is exposed. The keyboard panel 120 can bear a keyboard 332 to allow text entry or phone key entry. The keyboard 332 can be coupled to the keyboard panel 120 in a variety of ways. For example, the keyboard 332 can be mounted such that a portion of the keyboard panel 120 overlays the keyboard 332. In another example, the keyboard 332 can be mounted to the keyboard panel 120 at a rear side of the keyboard 332. Additionally, switches or other electrical connections can be provided between the keyboard 332 and the keyboard panel 120, thereby coupling the keyboard 332 to the keyboard panel 120. Additionally, a navigational input device, such as a trackball 121, can also be coupled on the keyboard panel 120 to control a cursor that may be displayed on the lighted display 322. This coupling can be similar to that of keyboard 332 and the keyboard panel 120. In the example translated configuration 2000, the display 322 is in a portrait orientation such that the length of the display screen is greater than its width. In other embodiments, the display 322 can be arranged such that it is in a landscape orientation in the translated configuration 2000. The translated configuration 2000 can accommodated a telephone mode of operation, a portrait viewing mode, and other operational modes.

FIG. 1C illustrates the handheld electronic device 300 in an expanded configuration 3000. In the expanded configuration 3000, the keyboard panel 120 is exposed, allowing access to the keyboard 322 and navigational input 121. Also, the display 322 is in a landscape orientation in relation to the keyboard panel 120 and can be used in a word-processing mode, a messaging mode, an internet mode, or the like. When the device 300 is configured as illustrated, it resembles a t-shape in the expanded configuration 3000.

In the expanded configuration 3000, the centerpoint 150 of the display panel 10 is positioned closer to the centerpoint 160 of the keyboard panel 120, as compared with the positions of the centerpoints 150, 160 in the translated configuration. When the centerpoint 150 of the display panel 10 closer to the centerpoint 160 of the keyboard panel 120 in the expanded configuration 3000 as compared to the translated configuration 2000, the device 300 can be more compact and ergonomic. This is desirable as handheld electronic devices 300 are being used frequently in several different environmental settings that make a more ergonomic device desirable. This repositioning can also provide for a lower center of gravity of the display panel 10 in the expanded configuration 3000 thereby preventing accidental release from a user's hand or hands when the electronic device 300 is cradled in the user's hand or hands. Additionally, the distance between the bottom of the display screen 322 and the keyboard 332 is substantially similar in both the portrait and landscape orientations of the display screen 322.

Examples of devices 300 that transition between the compact configuration 1000, translated configuration 2000, and expanded configuration 3000 to achieve a more compact and ergonomic handheld electronic device 300 will now be described.

FIGS. 4A-4C illustrate one exemplary embodiment of the handheld electronic device 300 transitionable between different configurations. In FIGS. 4A-4C, the outlines of the display panel 10 are shown in order to provide a see-through view such that disclosure of the coupling of the two panels can be more fully illustrated. The keyboard 332 is shown on the keyboard panel 120 for reference purposes. While the keyboard 332 has the configuration as described above, other keyboard configurations can be used instead. For example, the alphabetic keys of the keyboard can be arranged with one letter per alphabetic key. As illustrated a majority of the alphabetic keys have multiple letters per alphabetic key. In this embodiment, the handheld electronic device 300 has a keyboard panel 120 shaped to form a slot 410 and a display panel 10, coupled by a coupler 400. The coupler 400 can provide for rotary coupling, as will be described below, of the display panel 10 and the keyboard panel 120. As shown in FIG. 4A, the display panel 10 is positioned adjacent to and in substantial parallel orientation with the keyboard panel 120 in a compact configuration 1000. While in the illustrated example, the display panel 10 and keyboard panel 120 are substantially similar in shape and size, in other embodiments, the keyboard panel 120 and display panel 10 can be of different sizes and shapes. FIG. 4B illustrates the handheld device 300 in a translated configuration 2000. There, the coupler 400 slidingly engages the slot 410 during transition from the compact configuration 1000 to the translated configuration 2000. FIG. 4C illustrates the handheld device 300 in an expanded configuration 3000. The display panel 10 rotates about the coupler 400 during transition between the translated configuration 2000 and the expanded configuration 3000.

In FIGS. 4A-4C, the coupler 400 can be coupled to the back 11 of the display panel 10, as illustrated. In other embodiments, the coupler 400 can be coupled to the front 122 of the keyboard panel 120. Additionally, the word coupled as used herein contemplates that the listed components can be directly connected, connected through to each other through additional components, or some combination thereof. Additionally, the coupling of the components can be such that the coupling can be of a removable nature. The handheld device 300 can also include a resilient biasing member 420 coupled to the keyboard panel 120 and the coupler 400. The resilient biasing member 420 can be coupled at one end of the member 420 to at about one end of the keyboard panel 120 and at an opposite end of the member 420 to the coupler 400. The resilient biasing member 420 can be coupled to the coupler 400 at about a centerpoint of the coupler 400. As illustrated, the coupling of the resilient biasing member 420 to the coupler 400 is at a top face, but in other embodiments the coupling can be at other locations on the coupler 400. As illustrated, the distal end of the resilient member 420 is coupled to an end of the keyboard panel 120, and the proximal end of the resilient member 420 is coupled to the centerpoint of the coupler 400. The end of the keyboard panel 120 can be a top end of the keyboard panel 120. In general, the top end refers to the portion of the keyboard panel 120 located on a side opposite of the centerpoint 160 from the keyboard 332. As illustrated, the resilient member 420 is coupled to an upper left portion, in relation to the keyboard 332 when in a text entry orientation, of the keyboard panel 120.

The handheld device 300 depicted in FIGS. 4A-4C also includes a rotation control mechanism 430 that promotes smooth and controlled transitioning between the translated 2000 and expanded 3000 configurations. An example of such rotation control mechanism 430 can include at least one cord 440, where one end, such as the distal end, of the cord 440 is coupled to the keyboard panel 120 and another end, such as a proximal end, of the cord 440 is coupled to the coupler 400.

In FIG. 4A, the device 300 is in the compact configuration 1000 and the cord 440 of the rotation control mechanism 430 is loose, and the resilient member 420 is unstretched. As the device 300 is transitioned into the translated configuration 2000, the user slides the display panel 10 upward to expose the keyboard panel 120, which can have a keyboard 332, input keys, navigation input devices, or the like. The coupler 400 slides to the top of the slot 410 of the keyboard panel 120, as shown in FIG. 4B. The sliding motion extends the cord 440 of the rotation control mechanism 430 and compresses and relaxes the resilient member 420.

When the device 300 is transitioned from the translated configuration 2000 to the expanded configuration 3000, the display panel 10 can be rotated clockwise or counter-clockwise. With two cords 440, 450 as depicted in FIGS. 4B and 4C, the display panel 10 can rotate in a clockwise or counter-clockwise direction. In the illustrated embodiment of FIG. 4C, the display panel 10 is rotated in a clockwise direction. As the display panel 10 is rotated, the coupler 400 winds one of the cords 440, 450 of the rotation control mechanism 430. As the cord winds around the rotation control mechanism 430, the coupler 400 slides down the slot 410 from its position, in the translated configuration 2000, near the top of the slot 410. When two cords are provided, the rotation of the display panel 10 winds one cord 450 around the coupler 400 and loosens and slackens the other cord 440 of the rotation control mechanism 430. For example, the cord 450 on the left hand side is wound around the rotation control mechanism 430 as the display panel 10 is rotated in a clockwise direction. If the display panel were rotated in a counter-clockwise direction, the right hand cord 440 is wound around the rotation control mechanism 430 and the left hand cord 450 is slackened. As the coupler 400 slides lower in the slot 410 during rotation, the centerpoint 150 of the display panel 10 moves closer to the centerpoint 160 of the keyboard panel 120 in the expanded configuration 3000 as compared to the translated configuration 2000.

FIGS. 5A and 5B are side cross-sectional views of the device 300 depicted in FIGS. 4A-4C. FIG. 5A shows the device 300 in a compact configuration 1000, where the cords 440, 450 of the rotation control mechanism 430 are loose. FIG. 5B shows the device 300 in an expanded configuration 3000, where one of the cords 440, 450 of the rotation control mechanism 430 are taut until one of the cords 450 is wound around the coupler 400 when the display panel 10 is rotated.

FIGS. 6A-6C illustrate another exemplary embodiment of the handheld device 300 transitionable between different configurations. In FIGS. 6A-6C, the outlines of the display panel 10 are shown in order to provide a see-through view such that disclosure of the coupling of the two panels can be more fully illustrated. The keyboard 332 is shown on the keyboard panel 120 for reference purposes. While the keyboard 332 has the configuration as described above, other keyboard configurations can be used instead. For example, the alphabetic keys of the keyboard can be arranged with one letter per alphabetic key. As illustrated a majority of the alphabetic keys have multiple letters per alphabetic key. FIG. 6A illustrates a handheld electronic device 300 having a display panel 10, a keyboard panel 120 with the display panel 10 positioned adjacent to and in substantial parallel orientation with the keyboard panel 120 in a compact configuration 1000. A slot 410 is formed on the front 122 of the keyboard panel 120. The device 300 can also include a coupler 400 having a plurality of teeth 500. The coupler can be located at a rear of the display panel 10. In other embodiments, the coupler 400 can be coupled to the front of the keyboard panel. The coupler 400 slidingly engages the slot 410 during transition from the compact configuration 1000 to a translated configuration 2000. The coupler 400 couples the display panel 10 with the keyboard panel and can be coupled to the back 11 of the display panel 10. Additionally, at least one track 510 is included that also has a plurality of teeth 520. The at least one track 510 is substantially parallel to the slot 410 and is positioned such that the at least one track 510 engages the coupler 400 as the display panel 10 rotates. In at least one embodiment, the coupler 400 is configured such that a top and bottom of the coupler 400 rotate in relation to one another, thereby accommodating the rotation of the display panel 10 in relation to the keyboard panel 120.

When the device 300 is in the compact configuration 1000, the teeth 500 of the coupler 400 do not engage the teeth 520 of the at least one track 510. As the device 300 is transitioned from the compact configuration 1000 to the translated configuration 2000, the display panel 10 slides upward and the coupler 400 slides upward in the slot 410. In the translated configuration 2000, the coupler 400 is moved to approximately the top of the slot 410 and remains non-engaged to the at least track 510. In, the translated configuration 2000, the keyboard panel 120 is exposed which can expose a keyboard, a navigational input key, or other types of input keys.

As shown in FIG. 6C, to transition between the translated configuration 2000 to the expanded configuration 300, the display panel 10 is rotated with respect to the keyboard panel 120. This rotation of the display panel 10 with respect to the keyboard panel 120 can be about the coupler 400. As the display panel 10 is rotated, the coupler 400 slides down the slot 410, and the teeth 500 of the coupler 400 engage or mesh with the teeth 520 of the track 510. The device 300 can be rotated either clockwise or counter clockwise. FIG. 6 shows the device rotated clockwise. As the coupler 400 slides lower in the slot 410 during rotation, the centerpoint 150 of the display panel 10 moves closer to the centerpoint 160 of the keyboard panel 120 in the expanded configuration 3000 as compared to the translated configuration 2000.

Figure 6E:
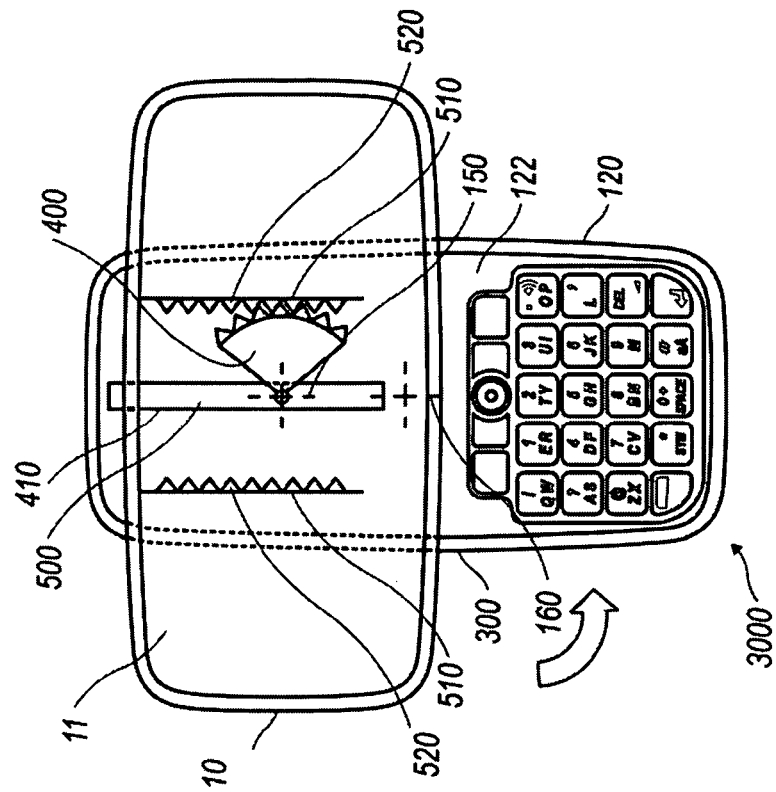
FIG. 6E is a partial see-through view of the another example handheld electronic device depicted in FIG. 6D illustrating the coupler engaged with the other of the two tracks.
Figure 6D:
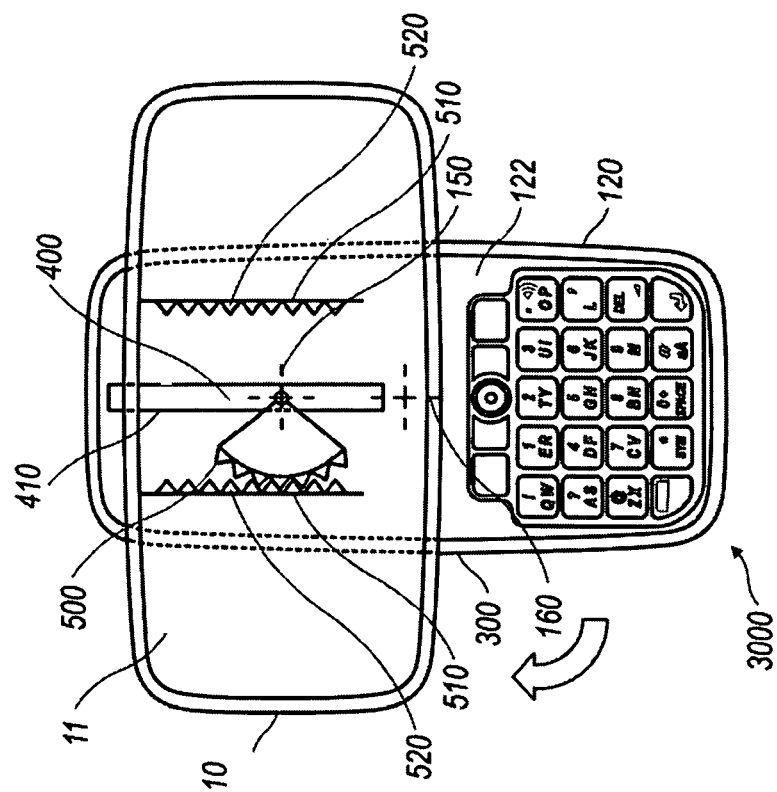
FIG. 6D is a partial see-through view of the another example handheld electronic device depicted in FIG. 6A in an expanded configuration and illustrating a coupler engaged with one of two tracks.

FIGS. 6D and 6E show further embodiment of the device 300 having a coupler 400 with teeth 500. FIGS. 6D and 6E show two tracks 510 having a plurality of teeth 520. One of the tracks 510 is located on a left side of the coupler 400, and the other of the tracks 510 is located on the right side of the coupler.

The movement of the coupler 400 in the compact configuration 1000 to the translated configuration 2000 is the same as described above with respect to a device 300 having one track 510. However, in a device 300 having two tracks 510 with a plurality of teeth 520, the device 300 can be configured to rotate both clockwise and counter-clockwise into an expanded configuration 3000. In FIG. 6D, the device 300 is rotated clockwise into the expanded configuration 3000. During this transition, the teeth 500 of the coupler 400 engage or mesh with the teeth 520 of the track 510 on the left side of the slot 410. In FIG. 6E, the device is rotated counter-clockwise into the expanded configuration 300. During counter-clockwise rotation, the teeth 500 of the coupler 400 engage or mesh with the teeth 520 of the track 510 on the right side of the slot 410. As the display panel 10 rotates the centerpoint 150 of the display panel 10 moves closer to the centerpoint 160 of the keyboard panel 120 in the expanded configuration 3000 as compared to the translated configuration 2000.

In either of the embodiments in FIGS. 6A-6C or FIGS. 6D-6E, the coupler 400 can have an outer perimeter that approximates a sector of a circle. In further embodiment, the sector can be approximately one-quarter of the circle. However, the coupler 400 can take the form of shapes other than a sector of a circle, such as a triangle or a cone or an oblong shape.

FIGS. 7A-7C show another exemplary embodiment of the device 300 transitionable between different configurations. In FIGS. 7A-7C, the outlines of the display panel 10 are shown in order to provide a see-through view such that disclosure of the coupling of the two panels can be more fully illustrated. The keyboard 332 is shown on the keyboard panel 120 for reference purposes. While the keyboard 332 has the configuration as described above, other keyboard configurations can be used instead. For example, the alphabetic keys of the keyboard can be arranged with one letter per alphabetic key. As illustrated a majority of the alphabetic keys have multiple letters per alphabetic key. FIG. 7A illustrates a handheld electronic device 300 having a display panel 10 greater in length than width. The device also has a lengthwise oriented centerline 700 that is substantially parallel with the length of the display panel 10. A t-shaped slot 600 is formed on a front 122 of the keyboard panel 120. The t-shaped slot 600 has a first portion 610 having a first size and oriented substantially parallel with the lengthwise oriented centerline 700. The t-shaped slot 600 also has a second portion 620 having a second size and oriented substantially perpendicular with the first portion 610. As illustrated, the size of the slot can be a width of the slot. In other embodiments, other configurations of relative sizes can be constructed such that the first portion 610 accommodates both the first surface 660 and second surface 650 of the cam 640.

The device 300 can also include a cam 640 coupled to the back 11 of the display panel 10. The cam 640 has a first surface 660 and a second surface 650. The first surface 660 of the cam 640 is sized such that the first surface 660 slidingly engages with the first portion 610 of the t-shaped slot 600 and the second surface 650 of the cam 640 slidingly engages with the second portion 620 of the t-shaped slot 600 when the device is rotated into the expanded configuration 3000 depicted in FIG. 7C. The cam 640 can also include a connecting member 670. The connecting member 670 couples the first surface 660 to the second surface 650 of the cam such that the second surface 650 is spaced a distance from the first surface 660. The connecting member 670 can also have a length of at least the width of the second surface 650. In a further embodiment of the connecting member 670, the connecting member 670 can have a portion with a width less than size of the second portion 620 of the t-shaped slot 600. This allows the second surface 650 of the cam 640 to slide within the second portion 620 of the t-shaped slot 600.

The resilient member 630 can be coupled to the keyboard panel at a first distal end 710 of the biasing member 630 and can be coupled to the centerpoint of the first surface 600 at a second proximal end 720 of the biasing member 630. In a further embodiment of the resiliently biasing member 630, the first end 710 of the biasing member 630 is coupled to the keyboard panel 120 at between the second portion 620 of the t-shaped slot 600 and a proximate end of the keyboard panel 120.

In the compact configuration 1000 shown in FIG. 7A, the cam 640 engages the first portion 610 of the t-shaped slot 600 and the biasing member 630 is relaxed. As the display panel 10 is slid upward into the translated configuration 2000 of FIG. 7B, the cam 640 slides upward in the first portion 610 of the t-shaped slot 600 and the biasing member 630 initially resists the motion and later encourages the sliding motion as it passes over a point at which substantially no force is exerted from the biasing member 630. When the display panel 10 is rotated into the expanded configuration 3000 of FIG. 7C, the first surface 660 and second surface 650 of the cam 640 are located in the first portion 610 of the t-shaped slot 600. As the display panel 10 completes the rotation, the second surface 650 of the cam 640 slideably engages the second portion 620 of the t-shaped slot 600, pulling the first surface 610 of the cam out of the top of the first portion 610 and into the center of the t-shaped slot 600. The display panel 10 may be rotated either clockwise or counter clockwise. In FIG. 7C, the device 300 is in an expanded configuration 3000 as a result of clockwise rotation. However, the device 300 can be configured for counter-clockwise rotation. In such an embodiment, the second surface 650 of the cam 640 slideably engages the right arm of the t-shaped slot 600. Because of the t-shape of the slot 600 and the position of the second portion 620 of the slot, the centerpoint 150 of the display panel 10 is closer to the centerpoint 160 of the keyboard panel 120 in the expanded configuration 3000 as compared to the position of the centerpoint 150 of the display panel 10 in relation to the keyboard panel 120 in the translated configuration 2000.

While the device illustrated in FIGS. 7A-7C illustrate a t-shaped slot 600 having four arms, in another embodiment of the t-shaped slot 600, the t-shape can have just three arms, where two of the arms are aligned parallel to the centerline 700 of the device 300. And the third arm is aligned perpendicular to the centerline 700. Depending on the position of the perpendicular arm the device 300 would only be configured for one type of rotation into the expanded configuration 3000: either clockwise or counter-clockwise rotation. For example, if the arm perpendicular to centerline 700 was positioned to the left of the centerline 700, the device 300 would only allow for clockwise rotation into the expanded configuration 3000. Alternatively, if the arm perpendicular to the centerline 700 was located to the right of the centerline 700, the device would only be configured for counter-clockwise rotation into the expanded configuration 3000.

Figures 8A, 8B, 8C:
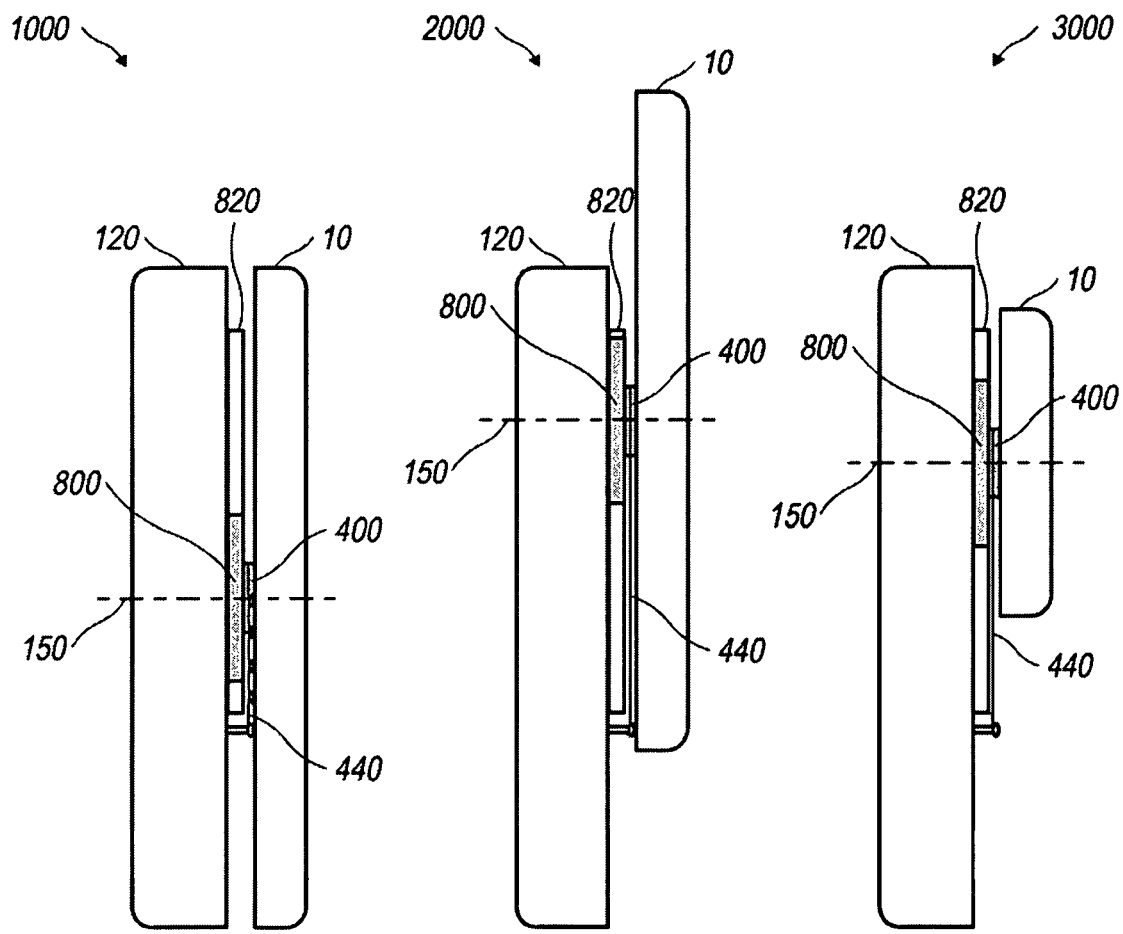
FIG. 8A is a cross-sectional side view of the handheld device configured according to the present application in a compact configuration and illustrating a coupler mounted to a slider.
FIG. 8B is a cross-sectional side view of the handheld device depicted in FIG. 8A in a translated configuration.
FIG. 8C is a cross-sectional side view of the handheld device depicted in FIG. 8A in an expanded configuration.

FIGS. 8A-8C illustrate another exemplary embodiment of the handheld device 300 transitionable between different configurations. The example device 300 illustrated therein has a slider 820 that connects the display panel 10 to the keyboard panel 120 and allows for translated movement of the display panel 10 into the translated configuration 2000. The display panel 10 is connected to the slider 820 by the coupler 400, which is mounted on the slide pad 800 of the slider 820. As the device 300 is transitioned from the compact configuration 1000 to the translated configuration 2000, the slide pad 800 slides along the sides of the slider 820. As the slider 800 transitions upward, the couple 400 travels upward along with the display panel 10, thereby exposing a portion of the keyboard panel 120.

Still referring to FIGS. 8A-8C, as the device is transitioned from the translated configuration 2000 to the expanded configuration 3000, the display panel 10 is rotated. As the display panel rotates, the coupler 400 urges the slide pad 800 to slide the down the slider 820 so that the centerpoint of the display panel 10 is closer to the centerpoint of the keyboard panel 120 in the expanded configuration 3000 as compared to the position of the centerpoint of the display panel 10 in relation to the keyboard panel 120 in the translated configuration 2000.

While, the slider 820 can be incorporated with any of the couplers 400 described above, FIGS. 8A-8C specifically illustrate a device 300 having a coupler 400 mounted on a slider 820 and coupled to a rotation control mechanism by a cord 440. In the illustrated embodiment, because the cord 440 of the rotation control mechanism winds around the coupler 400, the coupler 400 thereby urging the slide pad 800 to slide down the slider 820 as the device 300 is transitioned from the translated configuration 1000 to the expanded configuration 3000. After the transition to the extended configuration 3000, the centerpoint of the display panel 10 is closer to the centerpoint of the keyboard panel 120 in the expanded configuration 3000 as compared to the position of the centerpoint of the display panel 10 in relation to the keyboard panel 120 in the translated configuration 2000. In the expanded configuration 3000, the distance between the bottom of the display screen and the keyboard is substantially similar in both the translated configuration 2000 and the expanded configuration 3000.

FIGS. 9A-9C illustrate another exemplary embodiment of the handheld device 300 transitionable between different configurations. The example device 300 illustrated therein has a spring loaded mechanism 920, such as a spring load bias, a slider, or the like. FIGS. 9A-9C illustrate a spring loaded mechanism that is a spring 920. The spring loaded mechanism 920 allows for translated movement of the display panel 10 from a compact configuration 1000 into a translated configuration 2000. The handheld device 300 can have one of more protrusions 910 on the rear face of the display panel 10 near the centerpoint 150 of the display panel 10. In the embodiment illustrated in FIGS. 9A-9C, there are two protrusions 910: one protrusion 910 above the centerpoint 150 of the display panel 10 and one protrusion 910 below the centerpoint 150 of the display panel 10. The handheld device 300 can also have one or more apertures 900 on the front face of the keyboard panel 120. In the embodiment illustrated in FIGS. 9A-9C, there are two apertures 900 are located above the centerpoint 160 of the keyboard panel 120 and symmetrically about a vertical centerline 930 of the handheld device 300. The apertures 900 are sized to receive the protrusions 910 when the display panel 10 is rotated into the expanded configuration 3000. The transition of the handheld device 300 will now be discussed.

FIG. 9A illustrates the handheld device 300 in a compact configuration 1000. The spring loaded mechanism 920 is loaded to keep the handheld device 300 in a closed compact configuration 1000. In FIG. 9B, the display panel 10 is slid upward into the translated configuration 2000. During this transition, the spring loaded mechanism 920 is fully open to hold the handheld device 300 in the translated configuration 2000. To transition the handheld device 300 into the expanded configuration 3000, the display panel 10 is rotated. When the display panel is rotated 10, the spring loaded mechanism 920 is partially open, and the protrusions 910 are rotated. When the protrusions 910 are aligned with the apertures 900, the protrusions 910 securely fit within the apertures 900 to keep the handheld device 300 in the expanded configuration 3000 shown in FIG. 9C. In other embodiments, the apertures 900 can include detents to provide further assurance that the protrusions 910 are securely fit within the apertures 900. When the handheld device 300 is transitioned out of the expanded configuration 3000, the display panel 10 is rotated, and the force of rotation moves the protrusions 910 out of the apertures 900 and out of the expanded configuration 3000.

Figure 3A:
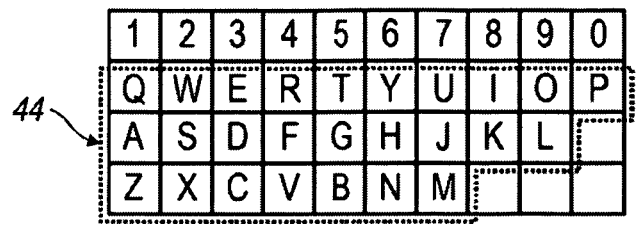
FIG. 3A illustrates an exemplary QWERTY keyboard layout.
Figure 3B:
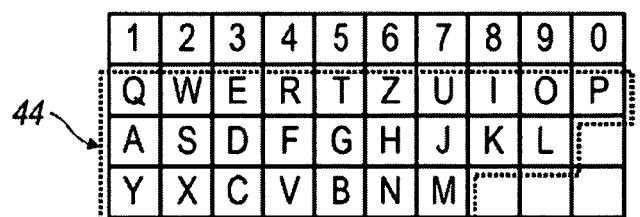
FIG. 3B illustrates an exemplary QWERTZ keyboard layout.
Figure 3C:
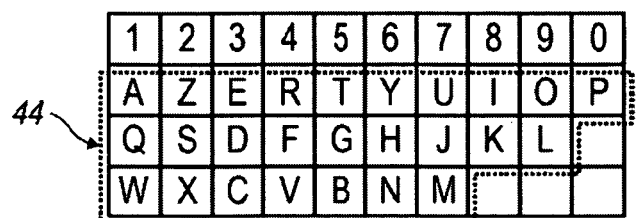
FIG. 3C illustrates an exemplary AZERTY keyboard layout.

As discussed above, the keyboard panel 120 can have keyboard 332 for entering text or other types of input. The keyboard 332 can have keys bearing alphabetic indicia. These alphabetic indicia can be arranged in a variety of layouts 44, examples of which are shown in FIGS. 3A-3C. For example, the keyboard 332 can have a QWERTY layout (FIG. 3A), a QWERTZ layout (FIG. 3B), an AZERTY layout (FIG. 3C), or other similar keyboard layout 44. Additionally, the keys of the keyboard can be arranged such that the keys having alphabetic indicia associated therewith can be associated with a single alphabetic character or a plurality of alphabetic characters. Furthermore, the keys can be associated with numbers, which can be arranged in a telephone arrangement according to ITU standard E.161, as illustrated in at least FIG. 1B.

In any of the above described embodiments of the handheld device 300 transitionable between different configurations, the device 300 can have a microprocessor 338 configured such that transitions between each of the configurations launch different device modes, applications, or functions of the device 300. For example, in the compact configuration 1000, the device 300 can be automatically set to a camera mode, a game mode, or a previewing mode. Alternatively, when the device 300 is transitioned into the compact configuration 1000, the device 300 can automatically launch a camera application. In the translated configuration 2000, the device 300 can be automatically set to a telephone mode. Alternatively, when the device 300 is transitioned into the translated configuration 2000, the device 300 can automatically exit a camera or video application and automatically launch a telephone action. In the expanded configuration 3000, the device 300 can be automatically set to a landscape viewing mode, an email mode, or a text entry mode. Alternatively, when the device 300 is transitioned into the expanded configuration 300, the device 300 can automatically close a telephone application and launch an email function or word-processing function.

In another embodiment, the device 300 can have a microprocessor 338 that is configured to automatically change the orientation of an image or display on the display screen 322. For example, when the device 300 is transitioned from the compact configuration 1000 to the translated configuration 2000, the orientation of the image or display that was on the display screen 322 in the compact configuration 1000 can be changed to a portrait orientation in the translated configuration 2000. Then, if the device 300 is rotated into the expanded configuration 3000, the microprocessor 338 can again change the orientation of the image or display on the display screen 322 in the translated configuration 2000 to a landscape orientation in the expanded configuration 3000.

Exemplary embodiments have been described hereinabove regarding both wireless handheld electronic devices, as well as the communication networks within which they cooperate. It should be appreciated, however, that a focus of the present disclosure is a handheld device 300 transitionable between different configurations including a compact configuration, translated configuration, and an expanded configuration.

What is claimed is:

1. A handheld electronic device transitionable between different configurations, said device comprising:
    a keyboard panel shaped to form a slot;
    a display panel;
    a coupler rotary coupling the keyboard panel and the display panel; and
    a resilient biasing member coupled at one end to the keyboard panel and at an opposite end to about a centerpoint of the coupler;
    wherein said display panel is positioned adjacent to and in substantial parallel orientation with the keyboard panel in a compact configuration;
    wherein said coupler slidingly engages the slot during transition from the compact configuration to a translated configuration;
    wherein said display panel transitions to an expanded configuration by rotation of the display panel about the coupler and a centerpoint of the display panel is closer to a centerpoint of the keyboard panel in the expanded configuration as compared to the translated configuration.

2. The handheld electronic device of claim 1, wherein said coupler is coupled to a back face of the display panel.

3. The handheld electronic device of claim 1, wherein said coupler comprises a rotation control mechanism.

4. The handheld electronic device of claim 3, wherein said rotation control mechanism comprises at least one cord coupled at one end to the keyboard panel and at another end to the coupler.

5. The handheld electronic device of claim 4, wherein said coupler winds said at least one cord in the event said display panel rotates from the translated configuration to the expanded configuration.

6. A handheld electronic device transitionable between different configurations, said device comprising:
    a display panel;
    a keyboard panel with said display panel positioned adjacent to and in substantial parallel orientation with the keyboard panel in a compact configuration;
    a slot formed on a front of the keyboard panel;
    a coupler having a plurality of teeth, said coupler located at a rear of the display and slidingly engaging the slot during transition from the compact configuration to a translated configuration;
    at least one track having a plurality of teeth and substantially parallel to said slot in said translated configuration;
    said coupler rotary coupled with said display panel, wherein said display panel rotates about said coupler in transition from said translated configuration to an expanded configuration, whereby said display panel is rotated with respect to the keyboard panel from said translated configuration; and
    said at least one track engages said coupler when the display panel rotates about said rotary coupling.

7. The handheld electronic device as recited in claim 6, wherein said teeth of the coupler and teeth of the at least one track mesh together in the expanded configuration.

8. The handheld electronic device as recited in claim 6, wherein said coupler has an outer perimeter that approximates a sector of a circle.

9. The handheld electronic device as recited in claim 8, wherein said sector of a circle is approximately one-quarter of the circle.

10. The handheld electronic device as recited in claim 6, wherein said at least one track comprises two tracks.

11. The handheld electronic device as recited in claim 10, wherein one of said two tracks is located on a left side of said coupler and the other of said two tracks is located on a right side of said coupler.

12. The handheld electronic device as recited in claim 11, wherein said track on the left side of said coupler engages with said coupler when the display panel is rotated in a clockwise direction and said track on the right side of said couple engages with said coupler when the display panel is rotated in a counter-clockwise direction.

13. A handheld electronic device transitionable between different configurations, said device comprising:
    a display panel having a greater length than width and a lengthwise oriented centerline which is substantially parallel with the length of the display panel;
    a keyboard panel with said display panel positioned adjacent to and in substantial parallel orientation with the keyboard panel;
    a t-shaped slot formed in a front of said keyboard panel, wherein said t-shaped slot comprises a first portion having a width of a first size and oriented substantially parallel with the lengthwise oriented centerline and a second portion having a width of a second size and is oriented substantially perpendicular with the first portion, wherein the first size is different from the second size;
    a cam coupled to a back of the display panel and having a first surface and a second surface, wherein the first surface of the cam is sized such that the first surface sliding engages with the first portion of the slot and the second surface of the cam sliding engages with the second portion of the slot during transition from a translated configuration to an expanded configuration; and a resiliently biasing member coupled at a first end to the keyboard panel and at a second end to the cam at about a centerpoint of the first surface.

14. The handheld electronic device as recited in claim 13, wherein said first end of the resiliently biasing member is coupled to the keyboard panel at between the second portion of the t-shaped slot and a proximate end of said keyboard panel.

15. The handheld electronic device as recited in claim 13, wherein the first surface of said cam couples to the second surface of said cam via a connecting member such that the second surface is spaced a distance from said first surface.

16. The handheld electronic device as recited in claim 15, wherein said connecting member has a length of at least a width of the second surface.

17. The handheld electronic device as recited in claim 16, wherein said connecting member has a portion with a width less than the second size of the second portion of the t-shaped slot.

18. The handheld electronic device as recited in claim 13, wherein a centerpoint of the display panel is closer to a centerpoint of the keyboard panel in the expanded configuration as compared to the translated configuration.

* * * * *